United States Patent
Maruo

(10) Patent No.: US 12,282,770 B2
(45) Date of Patent: Apr. 22, 2025

(54) STORAGE MEDIUM, ARITHMETIC OPERATION METHOD, AND INFORMATION PROCESSING APPARATUS

(71) Applicant: Fujitsu Limited, Kawasaki (JP)

(72) Inventor: Akito Maruo, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 18/319,516

(22) Filed: May 18, 2023

(65) Prior Publication Data

US 2024/0095030 A1    Mar. 21, 2024

(30) Foreign Application Priority Data

Sep. 21, 2022  (JP) ................... 2022-150067

(51) Int. Cl.
*G06F 9/30* (2018.01)
*G06F 9/345* (2018.01)

(52) U.S. Cl.
CPC ............ *G06F 9/3001* (2013.01); *G06F 9/345* (2013.01)

(58) Field of Classification Search
CPC ....... G06F 9/3001; G06F 9/345; G06N 10/60; G06N 5/01; G06N 3/126
See application file for complete search history.

(56) References Cited

U.S. PATENT DOCUMENTS

| | | | | |
|---|---|---|---|---|
| 7,730,002 B2* | 6/2010 | Afeyan | ............ | G06N 7/01 706/45 |
| 10,387,777 B2* | 8/2019 | Lilley | ............ | G06N 3/082 |
| 2018/0246851 A1* | 8/2018 | Zaribafiyan | ......... | G06F 9/30018 |
| 2019/0244098 A1* | 8/2019 | Tsukamoto | ............ | G06N 3/044 |
| 2020/0380065 A1 | 12/2020 | Tomita | | |
| 2020/0409918 A1* | 12/2020 | Mandal | .................... | G06N 5/01 |
| 2022/0180210 A1 | 6/2022 | Maruo et al. | | |
| 2022/0335323 A1* | 10/2022 | Takano | .................. | G06N 10/60 |

FOREIGN PATENT DOCUMENTS

| | | | | |
|---|---|---|---|---|
| EP | 1056042 A2 * | 11/2000 | ......... | G05B 13/0265 |
| EP | 3316184 B1 * | 3/2020 | ............... | G06F 8/36 |
| JP | 2014-044565 | 3/2014 | | |
| JP | 2020-194273 A | 12/2020 | | |

(Continued)

OTHER PUBLICATIONS

"A hybrid framework using a QUBO solver for permutation-based combinatorial optimization," Goh et al, Sep. 2020 (Year: 2020).*

(Continued)

*Primary Examiner* — Farley Abad
(74) *Attorney, Agent, or Firm* — Fujitsu Intellectual Property Center

(57) ABSTRACT

A non-transitory computer-readable storage medium storing an arithmetic operation program that causes at least one computer to execute a process, the process includes searching for first order information such that an evaluation value is updated as a generation progresses by using an evolutionary algorithm for a first individual that is a target of a combinatorial optimization process which includes an array search, the individual including the first order information; generating a first array by using the first order information; converting the first array into a QUBO format; and searching for a combination by using the converted first array.

12 Claims, 14 Drawing Sheets

(56) References Cited

FOREIGN PATENT DOCUMENTS

JP    2021-103417       7/2021
JP    2022-090249 A     6/2022

OTHER PUBLICATIONS

Goh, Siong Thye et al., "A Hybrid Framework Using a QUBO Solver For Permutation-Based Combinatorial Optimization", arXiv: 2009.12767v1, Sep. 27, 2020, XP081772365, pp. 1-28.
Kanamaru, Sho et al., "Mapping Constrained Slot-Placement Problems to Ising Models and its Evaluations by an Ising Machine", 2019 IEEE 9th International Conference on Consumer Electronics (ICCE-Berlin), IEEE, Sep. 8, 2019, pp. 221-226, XP033694054, [retrieved on Jan. 21, 2020].
Extended European Search Report dated Feb. 21, 2024 for corresponding European Patent Application No. 23173900.4, 9 pages.
Ryan Babbush et al., "Construction of Energy Functions for Lattice Heteropolymer Models: A Case Study in Constraint Satisfaction Programming and Adiabatic Quantum Optimization", arXiv:1211.3422v2 [quant-ph], Jun. 11, 2013, pp. 1-44 (Total pages).

\* cited by examiner

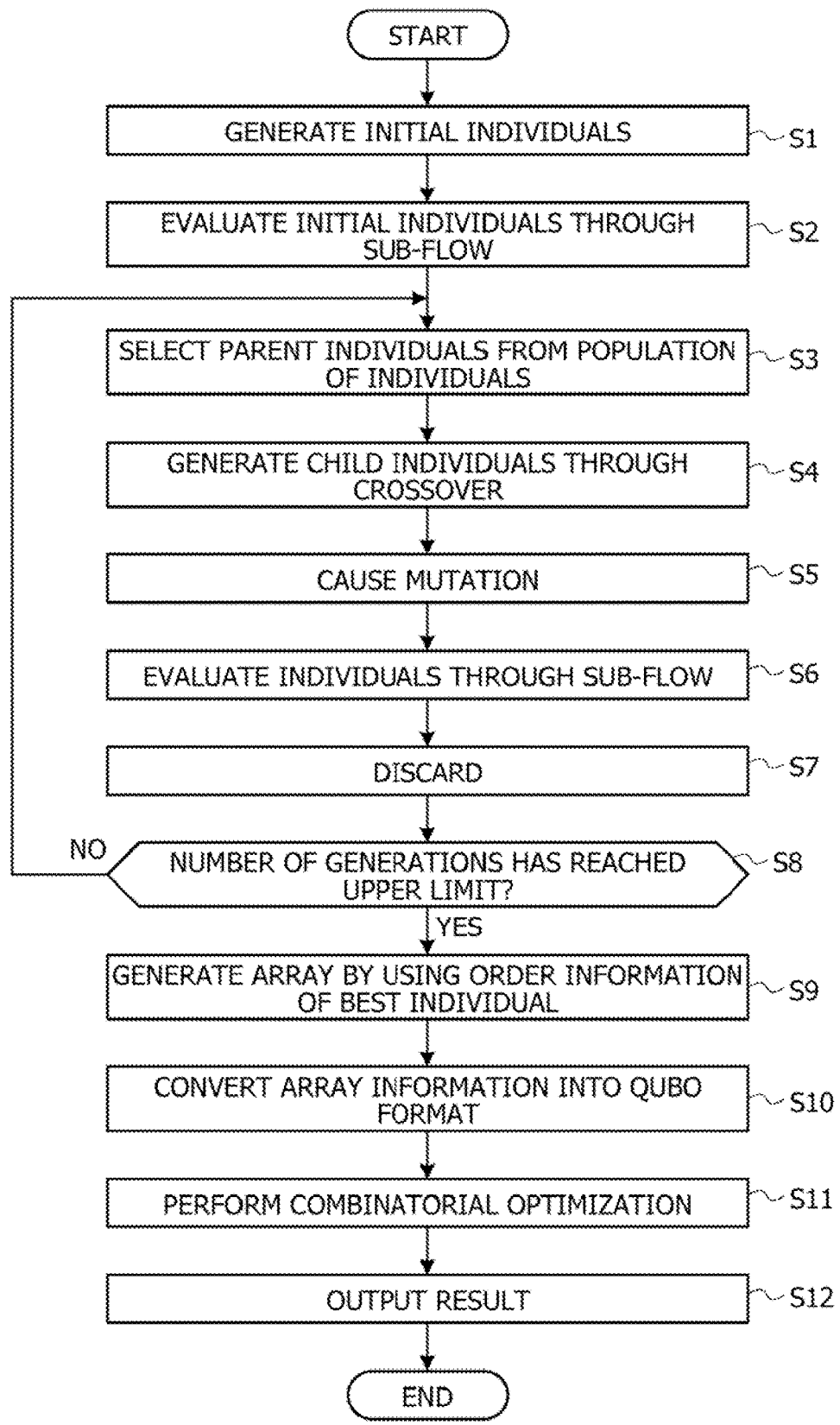

FIG. 6A

INITIAL STATE (ARRANGEMENT:AABBCC)

| ORDER | 1 | 2 | 3 | 4 | 5 | 6 |
|---|---|---|---|---|---|---|
| CHARACTER STRING | A | A | B | B | C | C |

FIG. 6B (ARRANGEMENT:AABBCAC)

| ORDER | 1 | 3 | 4 | 5 | 2 | 6 |
|---|---|---|---|---|---|---|
| CHARACTER STRING | A | B | B | C | A | C |

| ORDER | 2 | 4 | 3 | 6 | 1 | 5 |
|---|---|---|---|---|---|---|
| CHARACTER STRING | A | B | B | C | A | C |

BOND INTERACTION ( ———— )

|   | A | B | C |
|---|---|---|---|
| A | AA (BOND) | AB (BOND) | AC (BOND) |
| B |  | BB (BOND) | BC (BOND) |
| C |  |  | CC (BOND) |

NON-BOND INTERACTION ( -------- )

|   | A | B | C |
|---|---|---|---|
| A | AA (NON-BOND) | AB (NON-BOND) | AC (NON-BOND) |
| B |  | BB (NON-BOND) | BC (NON-BOND) |
| C |  |  | CC (NON-BOND) |

FIG. 8A
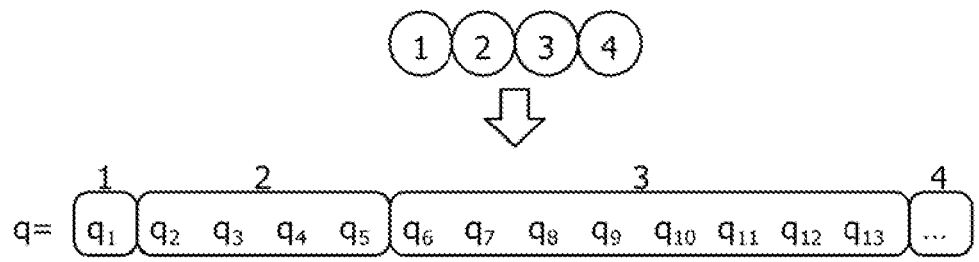
FIG. 8B  FIG. 8C
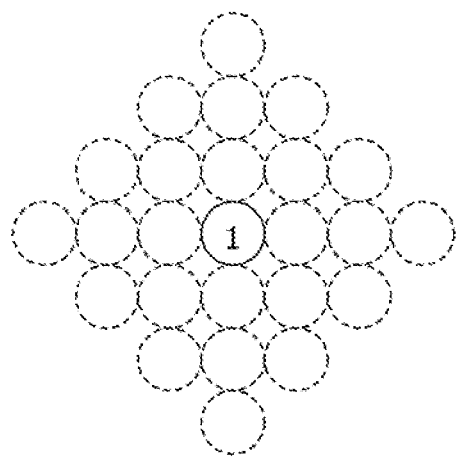 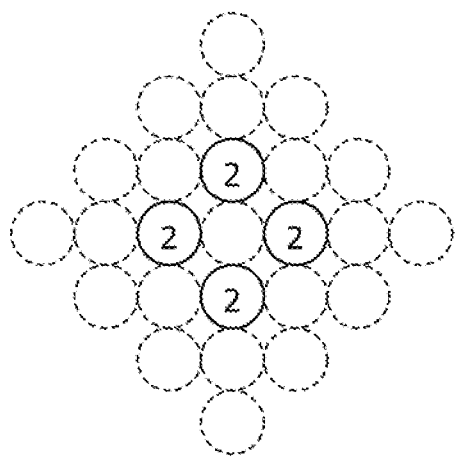
FIG. 8D  FIG. 8E
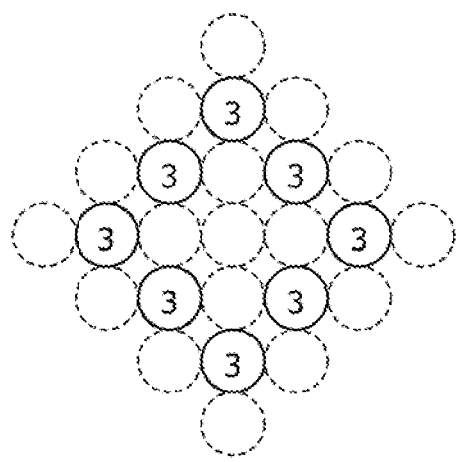 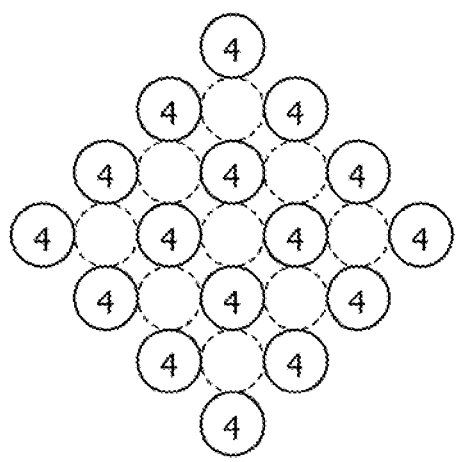

FIG. 13

BOND INTERACTION

|   | A   | B   | C   |
|---|-----|-----|-----|
| A | -68 | -31 | -25 |
| B |     | -81 | -86 |
| C |     |     | -91 |

NON-BOND INTERACTION

|   | A  | B   | C   |
|---|----|-----|-----|
| A | -1 | -25 | -52 |
| B |    | -12 | -50 |
| C |    |     | -36 |

STORAGE MEDIUM, ARITHMETIC OPERATION METHOD, AND INFORMATION PROCESSING APPARATUS

CROSS-REFERENCE TO RELATED APPLICATION

This application is based upon and claims the benefit of priority of the prior Japanese Patent Application No. 2022-150067, filed on Sep. 21, 2022, the entire contents of which are incorporated herein by reference.

FIELD

The embodiment discussed herein is related to a storage medium, an arithmetic operation method, and an information processing apparatus.

BACKGROUND

Techniques for performing combinatorial optimization including an array search have been disclosed.

Japanese Laid-open Patent Publication Nos. 2022-90249, 2020-194273, 2021-103417, and 2014-44565 are disclosed as related art.

SUMMARY

According to an aspect of the embodiments, a non-transitory computer-readable storage medium storing an arithmetic operation program that causes at least one computer to execute a process, the process includes searching for first order information such that an evaluation value is updated as a generation progresses by using an evolutionary algorithm for a first individual that is a target of a combinatorial optimization process which includes an array search, the individual including the first order information; generating a first array by using the first order information; converting the first array into a QUBO format; and searching for a combination by using the converted first array.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart depicting an example of an operation of the information processing apparatus;

FIGS. 6A and 6B are diagrams for describing an overview of the use of a cache;

FIGS. 8A to 8E are diagrams in which the presence or absence of a particle at each lattice position is represented by a bit;

FIG. 13 is a diagram illustrating bond interaction and non-bond interaction;

DESCRIPTION OF EMBODIMENTS

It is desired that a combinatorial problem including an array search is expressed in a quadratic unconstrained binary optimization (QUBO) format and is optimized. However, when the combinatorial problem including the array search is expressed in the QUBO format and the optimization is performed, the calculation cost increases.

In one aspect, an object of the present disclosure is to provide an arithmetic operation program, an arithmetic operation method, and an information processing apparatus that may reduce the calculation cost.

The calculation cost may be reduced.

It is desired that a combinatorial optimization problem including an array search is expressed in a QUBO format and the optimization problem expressed in the QUBO format is effectively optimized using an Ising machine such as a digital annealer. An array is a data structure used for storing and managing a set of a plurality of elements (values).

Figure 1:
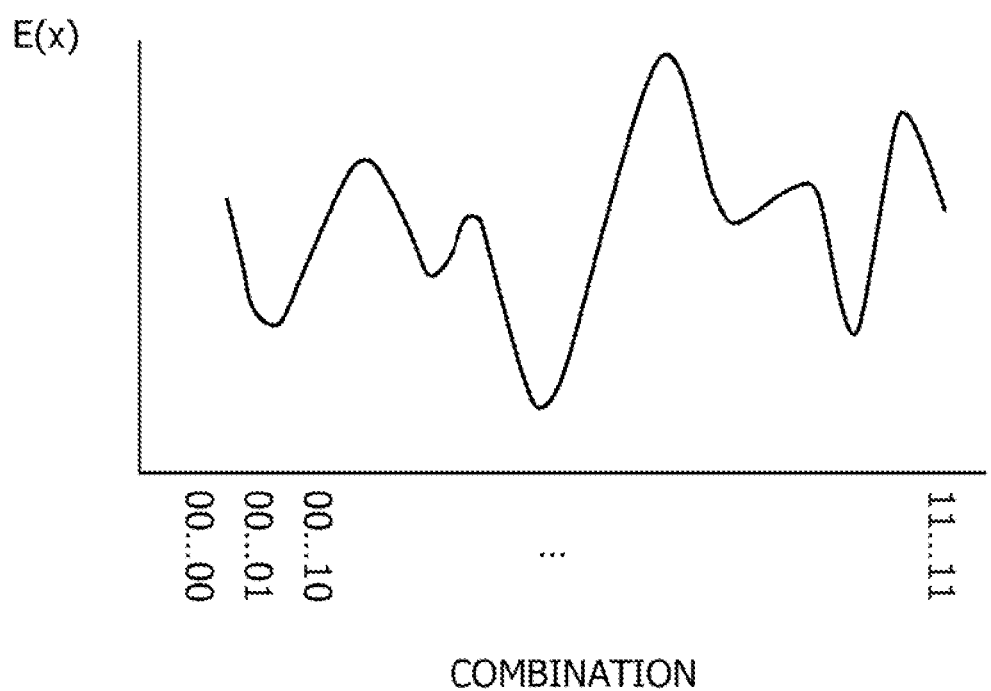
FIG. 1 is a diagram illustrating a search for a solution in a QUBO format.

QUBO stands for Quadratic Unconstrained Binary Optimization, and the QUBO format is a format that is free from a quadratic constraint and enables binary optimization. For example, the QUBO format may be represented by Expression below. $x_i=0$ or $1$ (where $i=1, \ldots, N$). $W_{ij}$ is a coupling coefficient between $x_i$ and $x_j$. $b_i$ is a bias coefficient of $x_i$. A first term on the right side is a quadratic term and represents interaction. A second term on the right side is a linear term and represents a bias effect. A third term on the right side is a constant term. In the QUBO format, x for minimizing $E(x)$ which represents energy is searched for according to Expression below as illustrated in FIG. 1.

$$E(x) = -\sum_{i,j} W_{ij} x_i x_j - \sum_i b_i x_i + const.$$

However, it is difficult to formulate all the combinatorial optimization problems including the array search into the QUBO format. For example, a constraint condition or the like is also to be incorporated into the QUBO format in accordance with the optimization problem, and the flexibility decreases.

Even if all the optimization problems may be expressed in the QUBO format, the number of bits becomes enormous in some cases. For example, in a case where a high-order term that is a quadratic term or higher is generated and a case where the problem scale is large, the number of bits becomes enormous.

When some of the optimization problems are not to be formulated into the QUBO format, all the possible combinations are to be searched and the best combination is to be selected as the solution for the optimization problems that are not to be formulated. Thus, the calculation cost becomes markedly enormous. For example, combinatorial optimization is to be performed for all possible arrays.

Accordingly, in an embodiment below, an example that enables a reduction in the calculation cost, a reduction in the time and effort for formulation into the QUBO format to improve the flexibility, and a reduction in the problem scale will be described.

Embodiment 1

Figure 2A:
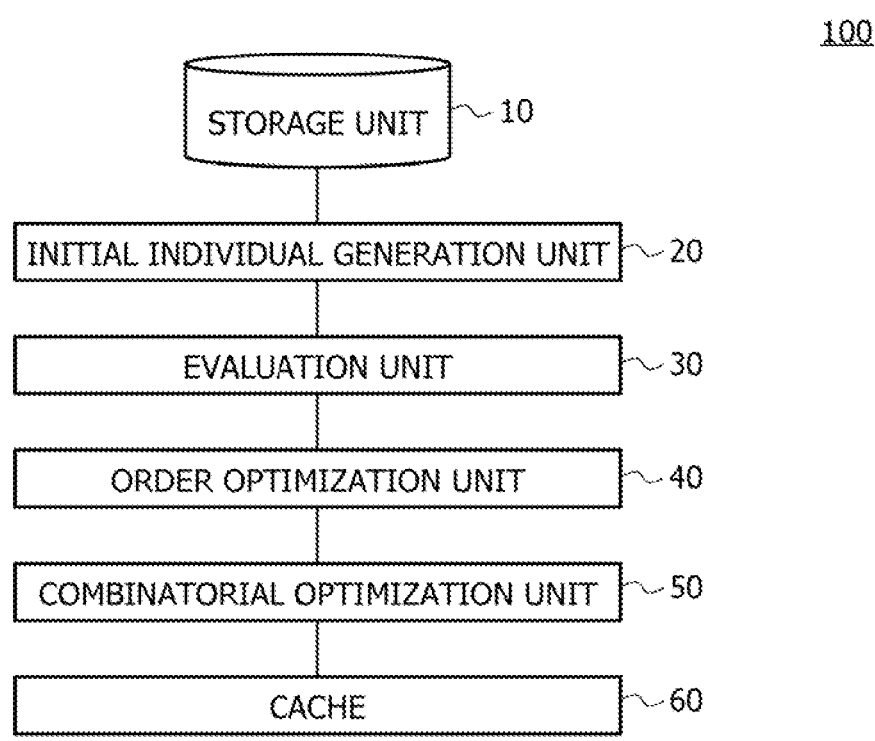
FIG. 2A is a block diagram illustrating an overall configuration of an information processing apparatus.

FIG. 2A is a block diagram illustrating an overall configuration of an information processing apparatus 100. As illustrated in FIG. 2A, the information processing apparatus 100 includes a storage unit 10, an initial individual generation unit 20, an evaluation unit 30, an order optimization unit 40, a combinatorial optimization unit 50, a cache 60, and so on.

Figure 2B:
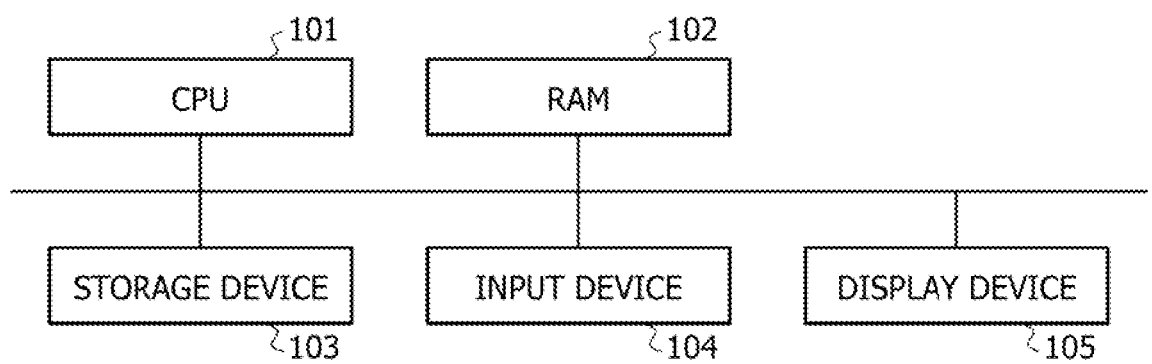
FIG. 2B is a block diagram illustrating a hardware configuration of the information processing apparatus.

FIG. 2B is a block diagram illustrating a hardware configuration of the information processing apparatus 100. As illustrated in FIG. 2B, the information processing apparatus 100 includes a central processing unit (CPU) 101, a random-access memory (RAM) 102, a storage device 103, an input device 104, a display device 105, and so on.

The CPU 101 is a central arithmetic processing unit. The CPU 101 includes one or more cores. The RAM 102 is a volatile memory that temporarily stores a program executed by the CPU 101, data processed by the CPU 101, and the like. The storage device 103 is a nonvolatile storage device. As the storage device 103, for example, a read-only memory (ROM), a solid-state drive (SSD) such as a flash memory, a hard disk to be driven by a hard disk drive, or the like may be used. The storage device 103 stores an arithmetic operation program. The input device 104 is an input device such as a keyboard and a mouse. The display device 105 is a display device such as a liquid crystal display (LCD). The CPU 101 executes the arithmetic operation program, so that the storage unit 10, the initial individual generation unit 20, the evaluation unit 30, the order optimization unit 40, the combinatorial optimization unit 50, and the cache 60 are implemented. Hardware such as a dedicated circuit may be used as the storage unit 10, the initial individual generation unit 20, the evaluation unit 30, the order optimization unit 40, the combinatorial optimization unit 50, or the cache 60.

FIG. 3 is a flowchart illustrating an example of an operation of the information processing apparatus 100. As illustrated in FIG. 3, by using data stored in the storage unit 10, the initial individual generation unit 20 generates a plurality of initial individuals and generates a population of individuals (step S1). The data stored in the storage unit 10 is each element that serves as a target of combinatorial optimization including an array search. A user may designate the initial individuals by using the input device 104, or the initial individual generation unit 20 may generate arrays at random. Each individual includes order information.

Figure 4:
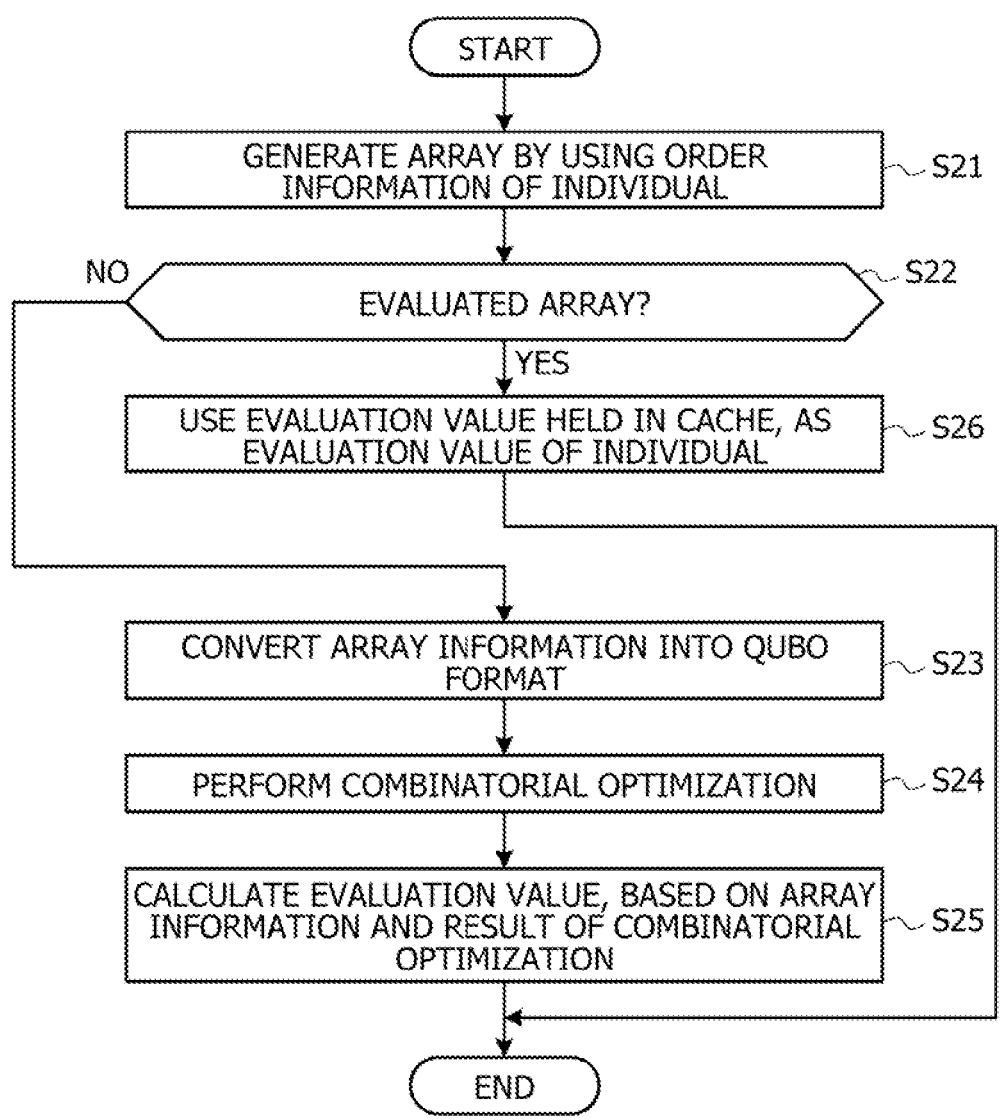
FIG. 4 is a flowchart illustrating a sub-flow.

Next, by performing a sub-flow of FIG. 4, the evaluation unit 30 evaluates each of the initial individuals (step S2). Details of the sub-flow of FIG. 4 will be described later.

Next, the order optimization unit 40 selects parent individuals from the population of individuals (step S3). For example, when step S3 is performed for the first time, individuals of which an evaluation value is greater than or equal to a threshold in step S2 are selected. When step S3 is performed for the second time or later, individuals of which an evaluation value is greater than or equal to the threshold in step S6 (described later) are selected.

Next, by using the parent individuals selected in step S3, the order optimization unit 40 generates child individuals through crossover (step S4).

Next, the order optimization unit 40 causes mutation in the child individuals generated in step S4 (step S5).

Next, by performing the sub-flow of FIG. 4, the evaluation unit 30 evaluates the individuals obtained in step S5 (step S6).

Next, for the results of step S6, the evaluation unit 30 discards individuals of which the evaluation value does not satisfy a criterion (step S7).

Next, the order optimization unit 40 determines whether the number of generations has reached an upper limit (step S8). If "No" is determined in step S8, the process is performed again from step S3. Through iterations of steps S3 to S8, the order information is optimized such that the evaluation in step S6 becomes better as the generation proceeds by handling the order information as the individual.

If "Yes" is determined in step S8, the combinatorial optimization unit 50 generates an array by using the obtained order information of the individual (step S9). For example, the combinatorial optimization unit 50 uses the order information of the individual with the best evaluation.

Next, the combinatorial optimization unit 50 performs QUBO calculation for converting the array information generated in step S9 into the QUBO format (step S10).

Next, the combinatorial optimization unit 50 performs combinatorial optimization on the array information that has been converted into the QUBO format (step S11). Although a technique of the combinatorial optimization is not particularly limited, for example, digital annealer optimization may be used. A digital annealer is a digital circuit conceived based on a quantum phenomenon, and is a technique for solving a "combinatorial optimization problem" at high speed.

Next, the combinatorial optimization unit 50 outputs a result of the combinatorial optimization (step S12). The output result is displayed on the display device 105.

FIG. 4 is a flowchart illustrating the sub-flow. The sub-flow of FIG. 4 is performed for each individual. As illustrated in FIG. 4, the evaluation unit 30 generates an array by using the order information of an individual (step S21).

Next, the evaluation unit 30 determines whether the array generated in step S21 is an evaluated array (step S22).

If "No" is determined in step S22, the evaluation unit 30 performs QUBO calculation for converting the array information generated in step S21 into the QUBO format (step S23).

Next, the evaluation unit 30 performs combinatorial optimization on the array information that has been converted into the QUBO format (step S24).

Next, based on the array information and the result of the combinatorial optimization, the evaluation unit 30 calculates an evaluation value of the individual (step S25). Then, execution of the sub-flow ends.

If "Yes" is determined in step S22, the evaluation unit 30 uses the evaluation value held in the cache 60, as the evaluation value of the individual (step S26). Then, execution of the sub-flow ends.

Figure 5:
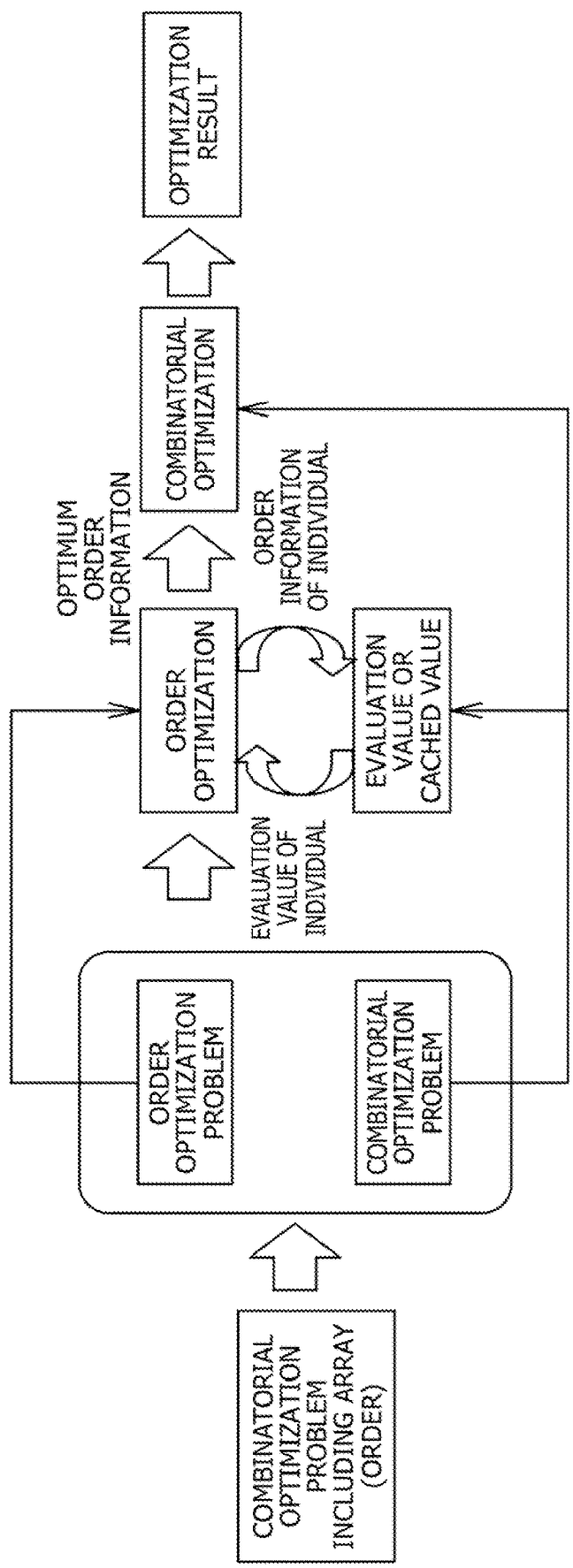
FIG. 5 is a schematic diagram in which a process performed by the information processing apparatus is visually organized to facilitate understanding.

FIG. 5 is a schematic diagram in which a process performed by the information processing apparatus 100 is visually organized to facilitate understanding. As illustrated in FIG. 5, the information processing apparatus 100 regards array optimization as an order optimization problem, and uses a genetic algorithm for optimizing the order as a main flow. When evaluating the value of the individual obtained using the genetic algorithm, the information processing apparatus 100 calls the sub-flow, performs combinatorial optimization in the QUBO format by using optimized order information of the individual, calculates an evaluation value based on the optimized order information and an optimized combination, and returns the evaluation value to the main flow. By performing such a process, the optimization problem may be separated into the order optimization and the combinatorial optimization.

By using a penalty method and taking also into account a constraint condition at the time of evaluation of the individual, the constraint specific to the problem may be easily introduced.

An array that has once been evaluated and an evaluation value thereof are stored in the cache 60. The cache 60 is referred to when an array is evaluated in the sub-flow. If the array is the evaluated array, the evaluation value held in the cache 60 is used. If the array has not been evaluated, optimization in the QUBO format is performed through combinatorial optimization and an evaluation value is calculated.

FIGS. 6A and 6B are diagrams for describing an overview of the use of the cache 60. FIGS. 6A and 6B describe a case of searching for an array of three kinds (A, B, and C). It is assumed that the number of elements to be arrayed is six. For example, two As, two Bs, and two Cs are arrayed. Conversion into order optimization will be discussed. An array search is performed by assuming an initial character string and optimizing the order of individual characters of the character string. FIG. 6A illustrates "AABBCC" which is an example of the character string in the initial state.

FIG. 6B is a diagram illustrating cases where the arrays are identical although the orders are different. An upper part of FIG. 6B illustrates an array in an order of "ABBCAC" for orders 1 to 6. A lower part of FIG. 6B illustrates the array of "ABBCAC" but the order is different from that in the upper part. Although the orders of these arrays are different, the arrays are identical.

An array is stored in the cache 60 as a key. Thus, once one of the array in the upper part and the array in the lower part of FIG. 6B is evaluated, the value held in the cache 60 may be used for the other. Because the same evaluation value is obtained for an array "CACBBA" which is in the reverse order of "ABBCAC", the array and the evaluation value may be stored in the cache 60.

According to the present embodiment, the array search is regarded as order optimization and is performed using an evolutionary algorithm. For the combination search, combinatorial optimization is performed in the QUBO format. As described above, by separating the optimization problem into the order optimization and the combinatorial optimization, a reduction in the calculation cost, a reduction in the time and effort for formulation into the QUBO format to improve the flexibility, and a reduction in the problem scale are enabled.

The cache 60 may be a cache memory in the CPU 101 in FIG. 2B or may be the RAM 102 in FIG. 2B. As an example, the cache 60 is a storage unit having a higher access speed than the storage unit 10.

Although the genetic algorithm is used in the example described above, another evolutionary algorithm may be used. An evolutionary algorithm is a technique of searching for a combination of explanatory variables such that an objective function satisfies a predetermined condition by applying the principle of evolution of living things.

Figures 7A, 7B:
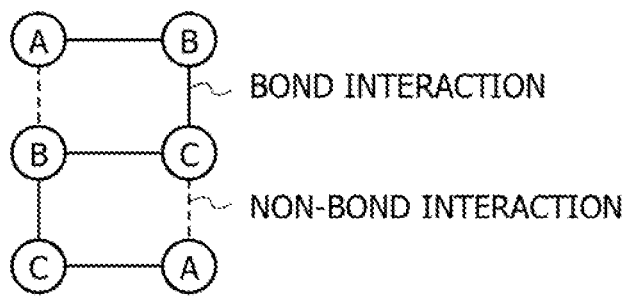
FIGS. 7A and 7B are diagrams illustrating a problem of searching for an array and a stable structure of molecules.
Figure 9A:
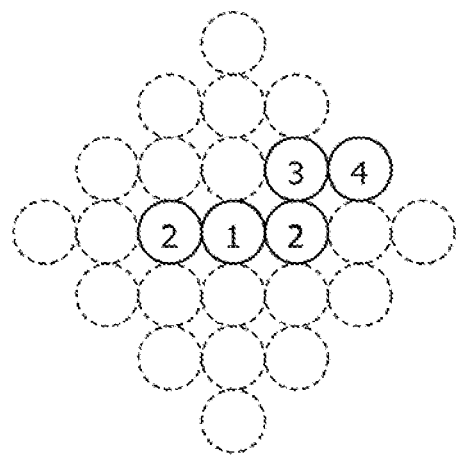
FIGS. 9A to 9D are diagrams for describing a diamond encoding method that exemplifies how a constraint condition and an objective function are to be.
Figure 9B:
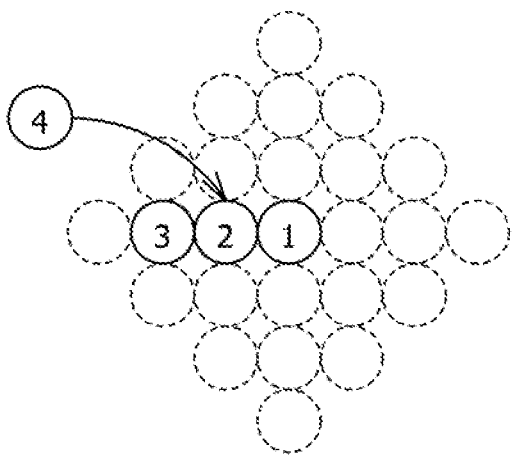
Figure 9C:
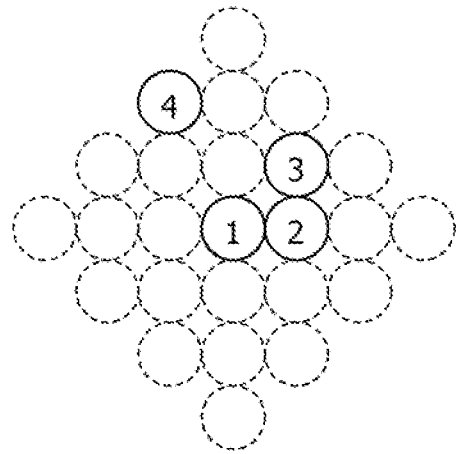
Figure 9D:
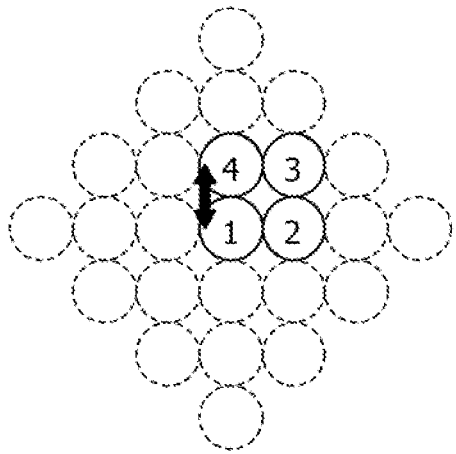

As an example of the problem for which the information processing apparatus 100 performs optimization, a problem of searching for an array and a stable structure of molecules will be described. An individual in this case is an individual that represents that, in a lattice space which is a set of lattices where a plurality of compound groups are sequentially arranged, any of the plurality of compound groups is arranged at any of the lattices in the lattice space. FIGS. 7A and 7B are diagrams illustrating a problem of searching for an array and a stable structure of molecules. FIGS. 7A and 7B illustrate a case where an optimum array and an optimum stable structure are searched for by taking into account bond interaction and non-bond interaction of molecules A to C.

FIG. 7A illustrates an array of the molecules A to C. Since molecules linked by a solid line are bound to each other, bond interaction occurs therebetween. Since molecules linked by a broken line are not bound to each other but are adjacent to each other, non-bond interaction occurs. FIG. 7B illustrates relationships of the bond interaction and the non-bond interaction.

Currently, a molecular stable structure search is already formulated into QUBO as a lattice protein problem (LPP) by using diamond encoding or the like. For example, in "R. Babbush, A. Perdomo-Ortiz, B. O'Gorman, W. Macready, and A. Aspuru-Guzik, arXiv:1211.3422v2 (2013).", a stable structure search is formulated into QUBO. However, if the stable structure search includes an array search, the stable structure search is not formulated into QUBO and is not to be handled as it is. When the stable structure search includes an array search, optimization of the stable structure search is to be performed for all possible arrays.

Accordingly, as in the present embodiment, molecular array optimization is performed as the order optimization by using an evolutionary algorithm, and the LPP in the QUBO format is performed as the combinatorial optimization using an Ising machine.

As illustrated in FIGS. 8A to 8E, the presence or absence of a particle at each lattice position is represented by a bit. FIG. 8A illustrates particles 1 to 4. As illustrated in FIG. 8B, the position of the particle 1 is a fixed position. FIG. 8C illustrates positions which the particle 2 may take. FIG. 8D illustrates positions which the particles 3 may take. FIG. 8E illustrates positions which the particles 4 may take. In this way, a bit array of a two-dimensional lattice model is illustrated.

FIGS. 9A to 9D are diagrams for describing a diamond encoding method that exemplifies how a constraint condition and an objective function are to be. In an example illustrated in FIG. 9A, a plurality of identical particles are present. In this case, the structure becomes unstable. In an example illustrated in FIG. 9B, different particles overlap each other. In this case, the structure also becomes unstable. In an example illustrated in FIG. 9C, the particle 4 is not bound to another particle. In this case, the structure also becomes unstable. In an example illustrated in FIG. 9D, the particle 1 and the particle 4 are adjacent to each other, and non-bound particles are adjacent to each other. In this case, interaction between the non-bound particles occurs.

QUBO formulation is performed by using this diamond encoding method. Expression below exemplifies formulation into QUBO. For example, $H_{one}$ is a constraint indicating that there is only one amino acid for each of first to N-th amino acids. $H_{conn}$ is a constraint indicating that the first to N-th amino acids are coupled to each other. $H_{olap}$ is a constraint indicating that the first to N-th amino acids do not overlap each other. $H_{pair}$ is a term for interaction between amino acids, and represents structural energy.

$$E(x)=H=H=H_{one}+H_{conn}+H_{olap}+H_{pair}$$

Figure 10:
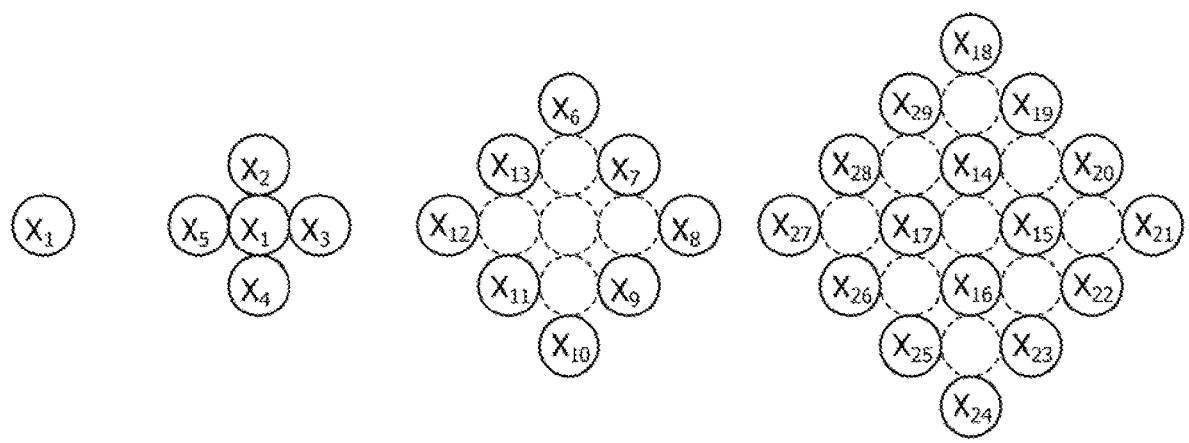
FIG. 10 is a diagram illustrating formulation in the QUBO format.

$H_{one}$ may be represented by Expression below. For example, only one of $X_2$, $X_3$, $X_4$, and $X_5$ that are adjacent to $X_1$ is "1" in FIG. 10. Thus, $H_{one}$ is a function whose energy increases when any two or more of $X_2$, $X_3$, $X_4$, and $X_5$ are "1", and is a penalty term that becomes "0" when only one of $X_2$, $X_3$, $X_4$, and $X_5$ is "1".

$$H_{one} = \lambda_{one} \sum_{i=0}^{N-1} \sum_{x_a, x_b, \in Q_i, a<b} x_a x_b$$

Figure 11:
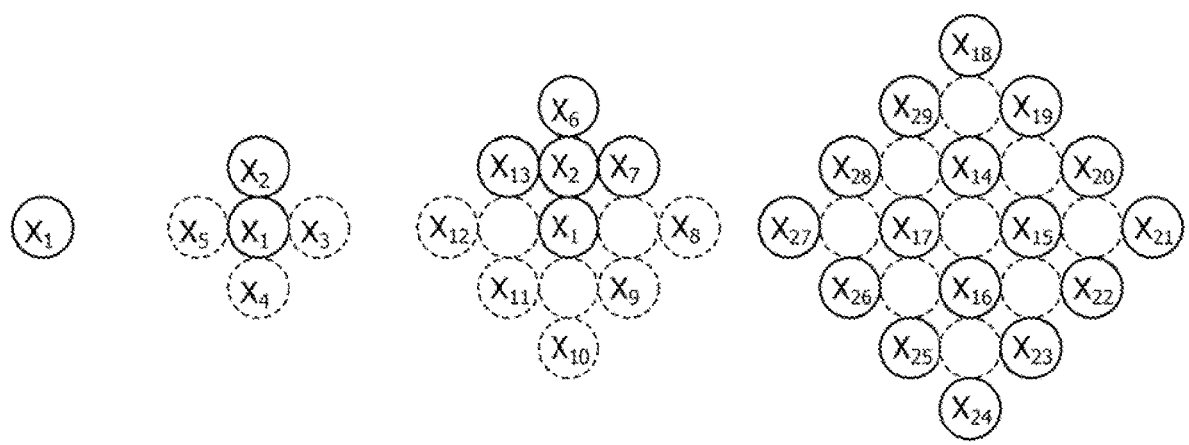
FIG. 11 is a diagram illustrating formulation in the QUBO format.

$H_{conn}$ may be represented by Expression below. For example, when $X_2$ is "1" in FIG. 11, $H_{conn}$ is an expression whose energy decreases if any of $X_{13}$, $X_6$, and $X_7$ that are adjacent to $X_2$ is "1", and is a penalty term that becomes "0" when all amino acids are bound to each other.

$$H_{conn} = \lambda_{conn} \left( N - 1 - \sum_{i=0}^{N-1} \sum_{x_d \in Q_i} \sum_{x_u \in \eta(x_d) \cap Q_{i+1}} x_d x_u \right)$$

$H_{olap}$ may be represented by Expression below. For example, when the $X_2$ is "1" in FIG. 10, $H_{olap}$ is a term for which a penalty occurs in a case where $X_{14}$ becomes "1" so as to overlap the position of $X_2$.

$$H_{olap} = \lambda_{olap} \sum_{v \in V} \sum_{x_a, x_b, \in \theta(v), a<b} x_a x_b$$

Figure 12:
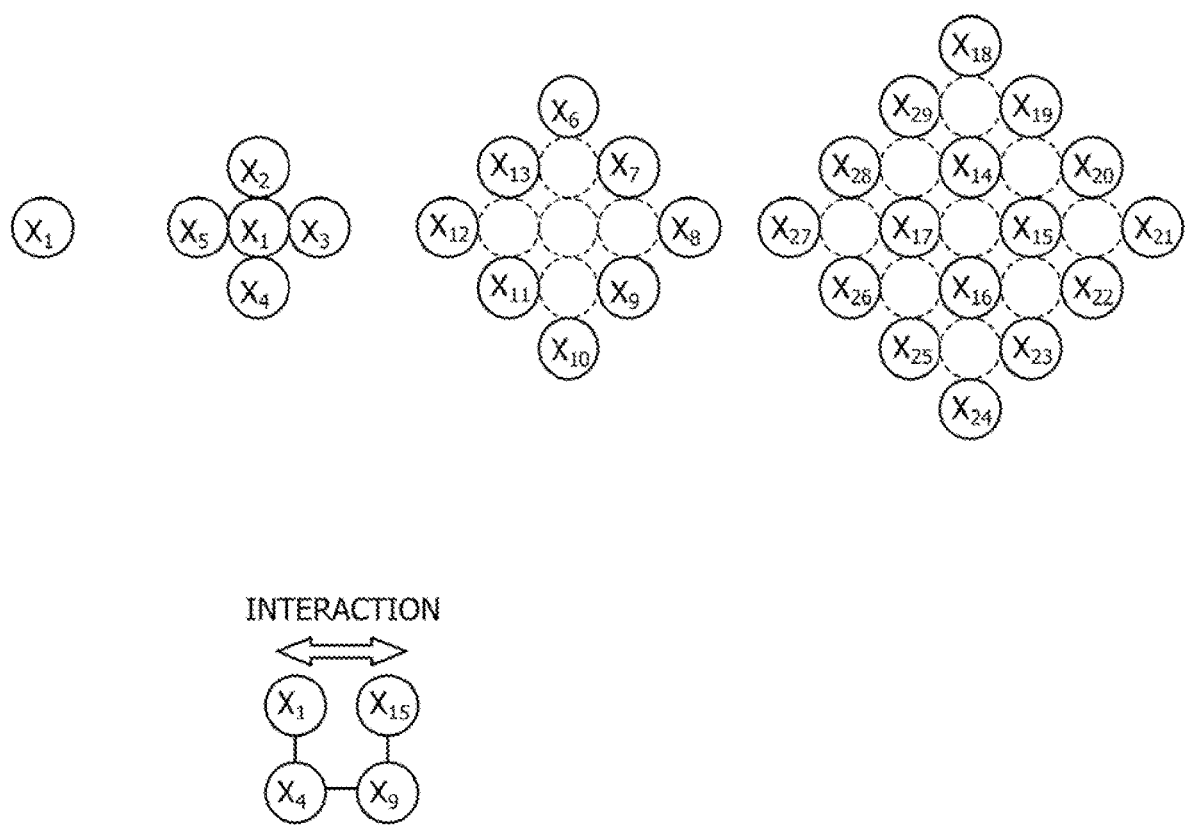
FIG. 12 is a diagram illustrating formulation in the QUBO format.

$H_{pair}$ may be represented by Expression below. For example, when $X_1$ is "1" in FIG. 12, $H_{pair}$ is a function whose energy decreases in a case where $X_{15}$ adjacent to $X_1$ becomes "1" because interaction $P_\omega(x_1)\omega(x_{15})$ acts between the amino acids $X_1$ and $X_{15}$. An interaction coefficient P is a negative value.

$$H_{pair} = \frac{1}{2} \sum_{i=0}^{N-1} \sum_{x_a \in Q_i} \sum_{x_b \in \eta(x_a)} P_{\omega(x_a)\omega(x_b)} x_a x_b$$

(Simulation Result)

A simulation result obtained by setting a virtual problem and performing the optimization process according to the embodiment will be described below. It is assumed that kinds of molecules are three kinds that are a molecule A, a molecule B, and a molecule C. It is assumed that the number of molecules is 10. For example, it is assumed that there are four molecules A, three molecules B, and three molecules C. An interaction coefficient is randomly generated. For example, it is assumed that the interaction coefficient is an integer from −100 to −1.

FIG. 13 illustrates bond interaction and non-bond interaction. As the evolutionary algorithm, the genetic algorithm is used. In the genetic algorithm, the number of individuals is set to 150, the number of generations is set to 50, the crossover probability is set to 0.7, the mutation probability is set to 0.3, and the number of parallel evaluations of individuals is set to 8.

Figure 14A:
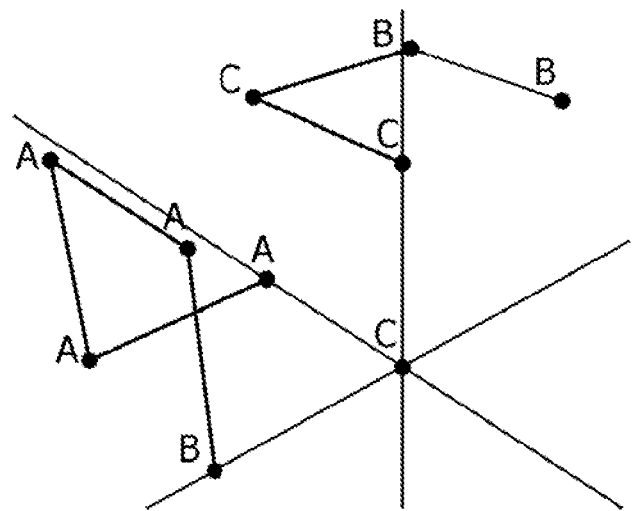
FIG. 14A illustrates a result obtained when a full array search and a lattice protein problem (LPP) are performed.

FIG. 14A illustrates a result obtained when the full array search and the LPP are performed. The obtained array is BBCCCBAAAA and E=−953 (bond: −670 and non-bond: −283). A time taken for analysis is 61.35 minutes.

Figure 14B:
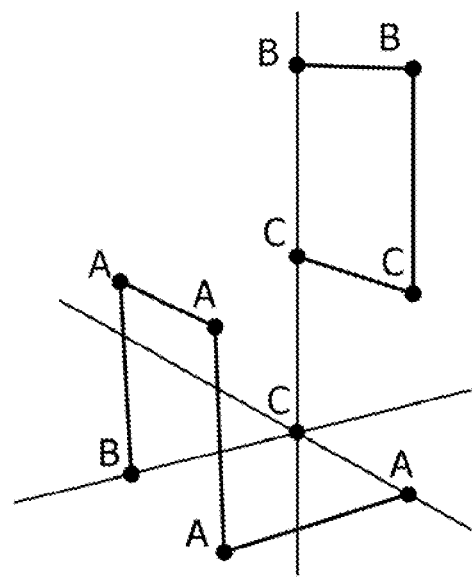
FIG. 14B illustrates a result obtained when the process according to an embodiment is performed.

FIG. 14B illustrates a result obtained when the process according to the present embodiment is performed. The obtained array is BBCCCBAAAA which is the same as that of FIGS. 14A and E=−953 (bond: −670 and non-bond: −283) which is the same as that of FIG. 14A. A time taken for analysis is 1.85 minutes.

As described above, it is found that, in a case where the process according to the present embodiment is performed, the same calculation result as that obtained in a case where the full array search and the LPP are performed is successfully obtained and the calculation time is successfully reduced greatly.

In the example described above, the order optimization unit 40 is an example of an order search processing unit configured to search for order information such that an evaluation value is updated as a generation progresses by using an evolutionary algorithm for an individual that is a target of a combinatorial optimization process which includes an array search and that has the order information. The combinatorial optimization unit 50 is an example of a combination search processing unit configured to generate an array by using the order information which is searched for by the order search processing unit and which the individual has, convert the generated array into a QUBO format, and search for a combination. The cache 60 is an example of a cache configured to store the evaluation value of the individual obtained with the evolutionary algorithm.

Although the embodiment of the present disclosure has been described in detail above, the present disclosure is not limited to such a particular embodiment and may be variously modified and changed within the scope of the gist of the present disclosure described in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an arithmetic operation program that causes at least one computer to execute a process, the process comprising:

searching for first order information such that an evaluation value is updated as a generation progresses by using an evolutionary algorithm for a first individual that is a target of a combinatorial optimization process which includes an array search, the first individual including the first order information;

generating a first array by using the first order information;

converting the first array into a QUBO format;

searching for a combination by using the converted first array;

obtaining a second evaluation value by generating a second array by using second order information of a second individual obtained with the evolutionary algorithm, converting the second array into the QUBO format, and calculating the second evaluation value of the second individual based on a result obtained by performing combinatorial optimization;

storing the second array and the second evaluation value of the second individual in a cache; and when a third array of a third individual obtained for a subsequent generation is identical to the second array of the second individual stored in the cache, reading the second evaluation value stored in the cache and using the second evaluation value in evaluation of the third individual.

2. The non-transitory computer-readable storage medium according to claim 1, wherein the first order information is information that indicates an order in which a plurality of elements included in the first individual are arrayed, and the combination is a combination related to the first array of the plurality of elements.

3. The non-transitory computer-readable storage medium according to claim 1, wherein the evolutionary algorithm is a genetic algorithm.

4. The non-transitory computer-readable storage medium according to claim 1, wherein the first individual is an individual that represents that, in a lattice space which is a set of lattices where a plurality of compound groups are sequentially arranged, one of the plurality of compound groups is arranged at one of the lattices in the lattice space.

5. An arithmetic operation method for a computer to execute a process comprising:

searching for first order information such that an evaluation value is updated as a generation progresses by using an evolutionary algorithm for a first individual that is a target of a combinatorial optimization process which includes an array search, the first individual including the first order information;

generating a first array by using the first order information;

converting the first array into a QUBO format;

searching for a combination by using the converted first array;

obtaining a second evaluation value by generating a second array by using second order information of a second individual obtained with the evolutionary algorithm, converting the second array into the QUBO format, and calculating the second evaluation value of the second individual based on a result obtained by performing combinatorial optimization;

storing the second array and the second evaluation value of the second individual in a cache; and when a third array of a third individual obtained for a subsequent generation is identical to the second array of the second individual stored in the cache, reading the second evaluation value stored in the cache and using the second evaluation value in evaluation of the third individual.

6. The arithmetic operation method according to claim 5, wherein the first order information is information that indicates an order in which a plurality of elements included in the first individual are arrayed, and the combination is a combination related to the first array of the plurality of elements.

7. The arithmetic operation method according to claim 5, wherein the evolutionary algorithm is a genetic algorithm.

8. The arithmetic operation method according to claim 5, wherein the first individual is an individual that represents that, in a lattice space which is a set of lattices where a plurality of compound groups are sequentially arranged, one of the plurality of compound groups is arranged at one of the lattices in the lattice space.

9. An information processing apparatus comprising:

one or more memories; and one or more processors coupled to the one or more memories and the one or more processors configured to:

search for first order information such that an evaluation value is updated as a generation progresses by using an evolutionary algorithm for a first individual that is a target of a combinatorial optimization process which includes an array search, the first individual including the first order information, generate a first array by using the first order information, convert the first array into a QUBO format, search for a combination by using the converted first array, obtain a second evaluation value by generating a second array by using second order information of a second individual obtained with the evolutionary algorithm, converting the second array into the QUBO format, and calculating the second evaluation value of the second individual based on a result obtained by performing combinatorial optimization, store the second array and the second evaluation value of the second individual in a cache, and when a third array of a third individual obtained for a subsequent generation is identical to the second array of the second individual stored in the cache, read the second evaluation value stored in the cache and use the second evaluation value in evaluation of the third individual.

10. The information processing apparatus according to claim 9, wherein the first order information is information that indicates an order in which a plurality of elements included in the first individual are arrayed, and the combination is a combination related to the first array of the plurality of elements.

11. The information processing apparatus according to claim 9, wherein the evolutionary algorithm is a genetic algorithm.

12. The information processing apparatus according to claim 9, wherein the first individual is an individual that represents that, in a lattice space which is a set of lattices where a plurality of compound groups are sequentially arranged, one of the plurality of compound groups is arranged at one of the lattices in the lattice space.

* * * * *